LESLIE HALL
ARTHUR E. LYNES
LAURIE MARTLAND
INVENTORS

LESLIE HALL
ARTHUR E. LYNES
LAURIE MARTLAND
INVENTORS

BY John R. Faulkner
John J. Roethel
ATTORNEYS

United States Patent Office 3,451,469
Patented June 24, 1969

3,451,469
VEHICLE HEATING AND VENTILATION SYSTEM
Leslie Hall, Hadleigh, Arthur E. Lynes, Thorpe Bay, and Laurie Martland, Basildon, England, assignors to Ford Motor Company, Dearborn, Mich., a corporation of Delaware
Filed Nov. 29, 1967, Ser. No. 686,399
Claims priority, application Great Britain, Apr. 12, 1967, 16,778/67
Int. Cl. B60h 1/28, 1/16, 1/02
U.S. Cl. 165—41      10 Claims

ABSTRACT OF THE DISCLOSURE

A heating and ventilation system for a motor vehicle in which the road wheels are driven by an electric motor and the vehicle body is supported on a hollow chassis member. The hollow chassis member, preferably the backbone of the vehicle, is the main trunk duct of the system and provides passageways for ducting hot and cold air. The heated air source is the electric motor. Provision is made for recirculating heated air for very cold conditions or for selectively mixing heated air with cold air for desired temperature control. The duct system preferably includes a forced air blower.

Background of the invention

For many years electrically propelled vehicles have not been able to compete in the passenger and commercial vehicle market with vehicles utilizing internal combustion engines as the prime mover. The use of electric propulsion has been substantially limited to golf carts and to material handling equipment used primarily within the confines of warehouses and factories. Recent emphasis on smog control in congested urban areas has revived engineering interest in electric propulsion since the latter does not have the exhaust emission problems inherent in internal combustion engines.

To be commercially successful, however, electrically propelled passenger vehicles must offer all of the comforts of vehicles now on the road. This particularly is true in the area of heating and ventilation of the interior of the vehicle body, i.e., the passenger compartment. The range that an electrically propelled vehicle can travel is directly related to its battery capacity and the drain on the battery is related to the weight of the vehicle, including the batteries, that must be propelled.

Accordingly, it is an object of the present invention to integrate the heating and ventilation system with the structural components of the vehicle to as great extent as possible to eliminate unnecessary weight and to utilize the electric motor of the vehicle propulsion system as the primary heat source for the heating function of the vehicle heating and ventilation system.

Summary of the invention

This invention relates to a heating and ventilation system for a motor vehicle in which the road wheels are driven by an electric motor and the vehicle body is supported on a hollow chassis member. The heating and ventilation system comprises an air inlet to the vehicle body. A duct system is connected to the air inlet which duct system includes the hollow chassis member as its main trunk duct. A plurality of branch ducts are connected to the main trunk duct. The electric motor is encompassed by a housing which is coupled to sections of the branch ducts. The system includes valve means in the duct system for selectively rounting the flow of air therethrough so that the motor is cooled by the air flow passing through the housing and the heat of the motor is utilizable as the heat source for the heating function of the heating and ventilation system.

Brief description of the drawings

Other objects, advantages and features of the present invention will become more apparent as this description proceeds, reference being made to the accompanying drawings, wherein.

Description of the invention

Figure 1:
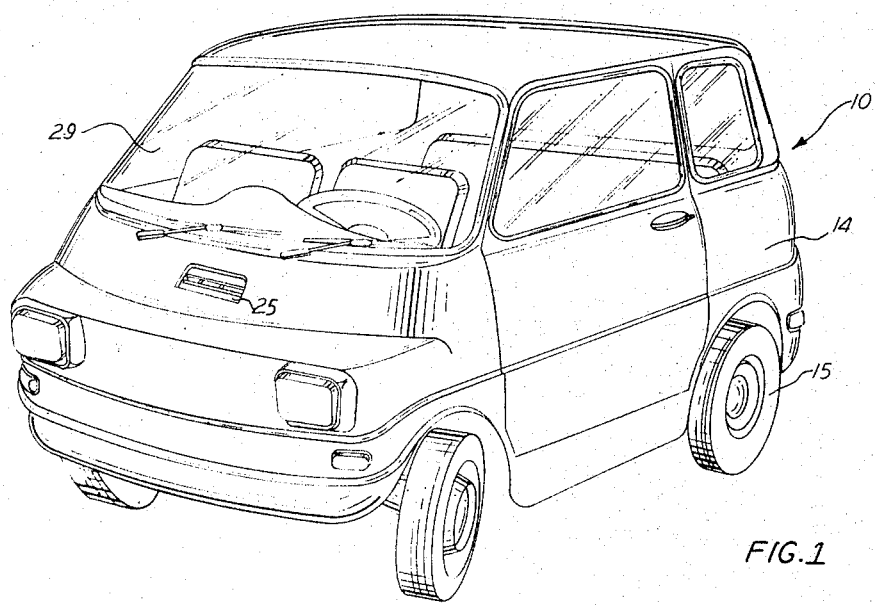
FIG. 1 is a perspective view of a vehicle incorporating the heating and ventilation system according to the present invention.
Figure 2:
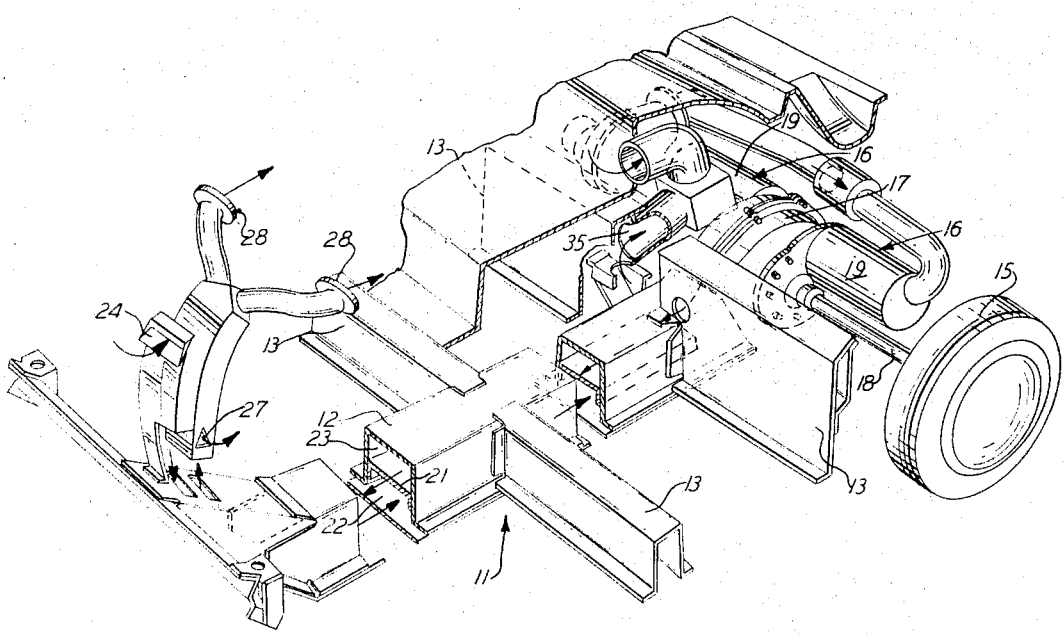
FIG. 2 is a fragmentary perspective view of the chassis of the motor vehicle of FIG. 1 with parts broken away and shown in section.

Referring now to the drawings, there is illustrated a vehicle, generally designated 10, having a chassis 11 which comprises a backbone 12 with outriggers 13 extending transversely from the backbone. The chassis 11 is made of pressed metal members welded together. The vehicle body 14 of the vehicle is mounted on the chassis 11.

The vehicle 10 has two rear wheels 15 (only one of which is visible) which are individually driven by two electric motors 16 through a final drive arrangement 17 and two half shafts 18, only one of which is visible. The motors 16 and the final drive unit 17 form a separate unit which is bolted to the rear end of the backbone 12. The specific details of construction of the motors and final drive units form no part of the present invention except that it is to be noted the electric motors are encompassed by housings 19.

The hollow interior of the backbone 12 is utilized as the main trunk duct of the heating and ventilation system and is divided longitudinally by a wall 21 into first and second passages 22 and 23, respectively. The first passage 21 has a fresh air inlet 24 at its front end into which air can pass from an intake opening 25 in the front of the vehicle body 14.

Figure 3:
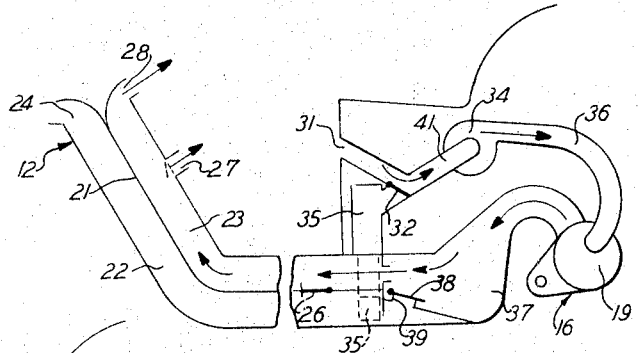
FIGS. 3 through 6, inclusive, are diagrammatic representations of the heating and ventilation system of the present invention when set in four possible operative conditions.

The first passageway 21 communicates with the second passageway 23 through a first valve 26, see FIG. 3. Air in the passageway 23 can be fed into the passenger compartment through either or both of two pairs of outlets 27 and 28. The first or main outlets 27 direct air into the interior of the vehicle and the second outlets 28 direct air onto the inside of the windshield 29.

Air in the passenger compartment is exhausted from the latter through an outlet 31 which is connected, through a second valve 32, to the inlet 33 of a blower 34. A bypass passageway 35 connects the first passageway 22 to the inlet of the blower 34 also through the second valve 32. Air from the blower 34 is fed to the housing 19 of the two electric motors 16 through a duct 36 and leaves the electric motors through a passageway 37. A third valve 28 can direct air from the electric motors 16 either out of the vehicle through an exhaust port 39 or recirculate the air into the passenger compartment through the second passageway 23.

The heating, ventilation and engine cooling system can be set to operate in any one of the four conditions shown in FIGS. 3 through 6, inclusive.

FIG. 3.—Recirculation-heat setting

In this condition, the first valve 26 is in its first position or in a position in which it blocks direct communication between the passageways 22 and 23 of the backbone 12 or main trunk duct of the heating and ventilating system embodying the present invention. The second valve 32 is in its second position or a position in which it blocks communication between the bypass passageway 35 and the inlet 41 to the blower 16. With the first, second and third valves in the positions shown in FIG. 3, air is exhausted from the passenger compartment through the outlet 31 through the blower 34 to the duct or passageway to the branch duct 36 to the motor housings 19. The relatively cool air cools the motors 16 and in turn is heated. The air from the motor 16 is then carried through the passageway 19 into the main trunk duct passageway 9 for distribution through the outlets 27 and 28 into the passenger compartment. It will be obvious that the third valve 38 could be set so that it blocks communication between the passageway 37 and the passageway 23 and causes the air heated by the motors 16 to be expelled from the vehicle to the exhaust port 39.

Figure 4:
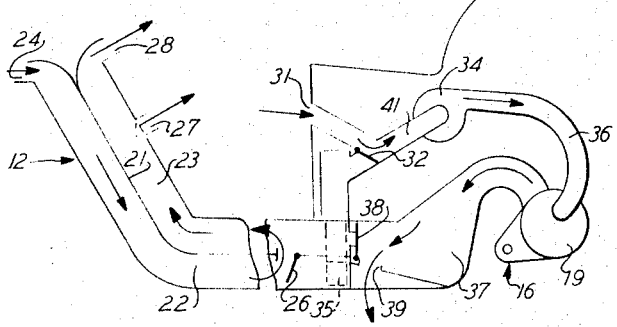

FIG. 4.—Fresh air-cold setting

In this condition, the first valve 26 is in its second position or in a position in which it provides direct communication between the passageways 22 and 23 of the main trunk duct formed by the vehicle backbone 12. The second valve 32 is in its second position or in a position in which it cuts off communication between the bypass passageway 17 and the inlet 41 to the blowers 34. The third valve 38 is in its first position or in a position in which it prevents communication between the passageway 37 and the passageway 23. Thus, fresh air entering the passenger compartment through the inlet 24 and by way of the first passageway 22 and the second passageway 23 through the main outlets 27 and 28 is exhausted through the compartment outlet 14 into the blower duct 41 through the blower 34 and then through the duct 36 leading to the motor 16. The air after cooling the motor 16 is then exhausted through the passageway 19 through the exhaust port 49 to the atmosphere.

Figure 5:
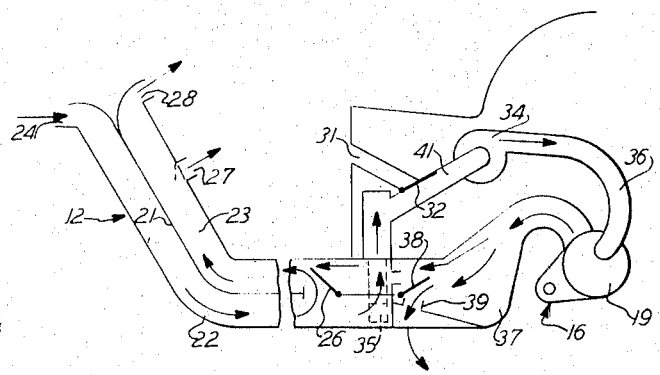

FIG. 5.—Fresh air-warm setting

In this condition, the first valve 26 is positioned so that there is partial communication between the passageway 22 and the passageway 23 of the main trunk duct formed by the backbone 12. The second valve 32 is in its first position in which it closes off the outlet 31 from the passenger compartment and permits communication between the passageway 35 which is in communication with the passageway 22 of the main trunk duct to the duct 41 leading to the blower 34. The third valve 38 is in an intermediate position so that it opens both the exhaust port 21 and communication between the passageway 37 and the second passage 23 of the main trunk duct. Thus, some of the fresh aid passes directly into the passenger compartment from the air intake 24 through the passageways 22 and 23 and some of the air is directed through the bypass 35 to the conduit 41 leading to the blower 34 from where it is forced by the latter through the conduit 36 to the motors 16. Some of the air heated by the motors 16 flows from the passageway 37 into the passageway 23 where it is mixed with the cooler air from the passageway 22 and some of the heated air from the motors 16 is expelled through the exhaust port 39.

The first valve 26 could be set at the neutral position between the passageways 22 and 23 shown in FIG. 3, the second valve 32 in the position as shown in FIG. 5, and the third valve in the position shown in FIG. 4, so that fresh air would be supplied from the inlet 24 directly to the motors 16 through the bypass 35 and then expelled through the exhaust port 39.

Figure 6:
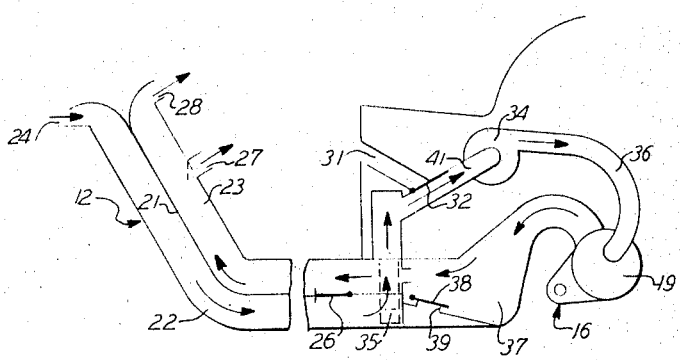

FIG. 6.—Fresh air-high temperature setting

In this condition, the first valve 26 is positioned so that it closes off communication between passageways 22 and 23 of the main trunk duct. The second valve 32 is positioned so that it closes off communication between the passenger compartment outlet 31 and the duct 41 leading to the blower 54. The third valve 38 is positioned so that it closes off the exhaust port 21. Thus, fresh air is fed from the intake 24 through the passageway 22 through the bypass 35 to the blower motor conduit 41 to the blower 34, through the conduit 36 to the electric motors 16. The heated air is then fed from the motors 16 through the bypass passageway 37 into the passageway 23 of the main trunk duct and then through the main outlets 27 and 28 to the passenger compartment.

It is to be understood that this invention is not limited to the exact construction illustrated and described above, but that various changes and modifications may be made without departing from the spirit and scope of the invention as defined in the appended claims.

What is claimed is:

1. A heating and ventilation system for a motor vehicle in which the road wheels are driven by an electric motor and the vehicle body is supported on a hollow chassis member, said heating and ventilation system comprising:
   an air inlet into said vehicle body;
   a duct system connected to said air inlet;
   said duct system including a hollow chassis member as its main trunk duct;
   and a plurality of branch ducts connected to said trunk duct;
   a housing encompassing the electric motor and coupled to sections of said branch ducts;
   and valve means in said duct system for selectively routing the flow of air therethrough so that the heat of the motor is utilizable as the heat source for the heating function of the heating and ventilation system.

2. A heating and ventilation system according to claim 1 in which:
   the main trunk duct has a partition therethrough dividing the latter into dual air flow passageways;
   and the valve means can be set to route air from the air inlet through said dual passageways directly into said vehicle body while bypassing the housing of the electric motor.

3. A heating and ventilation system according to claim 1 in which the main trunk duct has a partition therethrough dividing the latter into dual air flow passages, and the valve means can be set to route air from the first one of said dual passageways into the branch ducts coupled to said motor housing for discharge into the second one of said dual passageways and then into said vehicle body.

4. A heating and ventilation system according to claim 3 in which the second one of said dual passageways has at least one first main air outlet into the interior of the vehicle body and at least one second main outlet for directing air onto the interior of a vehicle windshield.

5. A heating and ventilation system according to claim 1 in which the main trunk duct has a partition therethrough dividing the latter into dual air flow passageways, and the valve means can be set to route air from a first one of said dual passageways into the branch ducts coupled to said motor housing for discharge into the atmosphere while bypassing the second one of said dual passageways.

6. A heating and ventilation system according to claim 1 in which the main trunk duct has a partition therethrough dividing the latter into dual air flow passageways, and the valve means can be set to route air from a first one of said dual passageways into the branch ducts coupled to said motor housing for proportionately discharging heated air into the atmosphere and into the second one of said dual passageways and from the latter into said vehicle body.

7. A heating and ventilation system according to claim 6 in which the second one of said dual passageways has at least one first main air outlet into the interior of the vehicle body and at least one second main outlet for directing air onto the interior of a vehicle windshield.

8. A heating and ventilation system according to claim 1 in which the main trunk duct is partitioned to provide at least a first and second air flow passageways in communication with each other, one of said passageways being in communication with the air outlet and the other of said passageways being in communication with the interior of the vehicle body;
- (a) a first valve which in a first position closes communication between the first and second passageways and in a second position opens communication between the first and second passageways;
- (b) a second valve which in a first position closes an air outlet from the interior of the vehicle body and opens a bypass passage and in a second position opens an air outlet from the interior of the vehicle body and closes the bypass passage; and
- (c) a third valve which in a first position opens an exhaust port for air heated by the motor and closes communication between the motor housing and the second passageway and in the second position closes the exhaust port and opens communication between the motor housing and the second passageway so that air heated by the motor can be recirculated into the interior of the vehicle body.

9. A heating and ventilation system according to claim 8 in which the second one of said dual passageways has at least one first main air outlet into the interior of the vehicle body and at least one second main outlet for directing air onto the interior of the vehicle windshield.

10. A heating and ventilation system for a motor vehicle according to claim 9 in which the duct system includes a blower to force air through the main trunk duct and branch duct.

References Cited

UNITED STATES PATENTS

| 2,612,964 | 10/1952 | Hobbs | 180—54 |
| 2,886,120 | 5/1959 | Broell | 180—54 |
| 3,395,770 | 8/1968 | Babbitt | 180—65 |

ROBERT A. O'LEARY, *Primary Examiner.*

CHARLES SUKALO, *Assistant Examiner.*

U.S. Cl. X.R.

98—2; 180—54, 65; 237—12.3